United States Patent
Chang et al.

(10) Patent No.: US 7,378,172 B2
(45) Date of Patent: May 27, 2008

(54) TUBULAR MEMBRANE ELECTRODE ASSEMBLY WITH LEADING WIRE

(75) Inventors: Hwei-Lang Chang, Gia-Ann Village (TW); Hen-Rong Chang, Pingjhen (TW); Kuo-Lon Shieh, Longtan Township, Taoyuan County (TW); Pi-Hsin Chung, Jhongli (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 439 days.

(21) Appl. No.: 11/124,093

(22) Filed: May 9, 2005

(65) Prior Publication Data

US 2006/0251942 A1    Nov. 9, 2006

(51) Int. Cl.
*H01M 8/10* (2006.01)
*H01M 4/00* (2006.01)

(52) U.S. Cl. ............................ 429/31; 429/40
(58) Field of Classification Search ............ 429/31, 429/40, 42

See application file for complete search history.

(56) References Cited

U.S. PATENT DOCUMENTS 6,001,500 A * 12/1999 Bass et al. .................... 429/31

FOREIGN PATENT DOCUMENTS

EP    1 237 220    * 9/2002

* cited by examiner

*Primary Examiner*—Patrick Ryan
*Assistant Examiner*—Thomas H. Parsons
(74) *Attorney, Agent, or Firm*—Troxell Law Office, PLLC

(57) ABSTRACT

Electrode catalyst slurry and a tubular conductive layer with leading wire are adhered on the inner and outside surface of a tubular proton membrane to be heated and pressed, where the leading wire of the tubular conductive layer and a conductive coating are formed into a whole without electroplating while avoiding the characteristic change of the electrode catalyst; and where the leading wire is led along the surface of the membrane with the characteristics of avoiding jamming the spindle space and of no side floss.

28 Claims, 3 Drawing Sheets

TUBULAR MEMBRANE ELECTRODE ASSEMBLY WITH LEADING WIRE

FIELD OF THE INVENTION

The present invention relates to a Membrane Electrode Assembly (MEA); more particularly, relates to adhering electrode catalyst slurry and a tubular conductive layer with leading wire on the inner and outside surface of a tubular proton membrane and pressing with heat to obtain a tubular MEA with leading wire to be applied to a fuel cell.

DESCRIPTION OF THE RELATED ART(S)

An MEA with leading wire according to a prior art comprises a proton membrane, an electrode catalyst and a tubular conductive layer with leading wire. According to a prior art, a hydrogen fuel cell made of a polymer electrolyte membrane (polymer electrolyte membrane fuel cell, PEMFC) finds difficulties in storing and transporting hydrogen fuel so that DMFC has become one of the most potential energy item of fuel cell in the upcoming market. Yet, the electric power output per unit volume of the DMFC is far less than that of the hydrogen fuel cell, which has become a disadvantage on the development. One of the solutions can be to increase the amount of the MEAs per unit volume of the DMFC, where a geometric structure of a tubular MEA is one of the best designs with more membrane area that can be applied to the design of the hydrogen fuel cell. For example, US patent of U.S. Pat. No. 3,228,797 describes a hydrogen fuel cell with more membrane area, which can be applied to a DMFC as well. In the patents of U.S. Pat. No. 3,331,758 and U.S. Pat. No. 3,351,487, methods for coating a tubular electrode catalyst are revealed, which apply chemical plating following electroplating; yet the adhesion after the plating and the characteristic change of the catalyst after the electrolysis are so arguable that make it still not available in the market.

Another disadvantage of the techniques for the MEA of the prior art is the technique of deploying the leading wire after the assembly of a membrane and an electrode. In the patent of U.S. Pat. No. 3,423,243, a stalk wire is inserted at the center accompanying with a side line or being welded with floss, which increases the fluid resistance in the tubular. At that time, the fuel for the hydrogen fuel cell is fed in a gas state so that the fluid resistance matters not; yet, for now, the fuel for a fuel cell, like DMFC, is fed in a liquid state so that the fluid resistance matters much. In addition, two processes of obtaining a membrane with catalyst and inserting a stalk wire leave room for improvement.

SUMMARY OF THE INVENTION

Therefore, the main purpose of the present invention is to provide a tubular MEA with leading wire. Herein, a polymer grain of a fluorocarbon ionomer or a hydrocarbon ionomer is melted to obtain an original mold of a proton-exchange membrane through a high temperature extrusion. The original mold of the proton-exchange membrane is transformed into a tubular proton membrane with a proton-exchange function by an ion exchange. In the process of transforming by the ion exchange, at least a chemical agent of a strong acid compound or of a strong alkali compound and a strong acid compound is used respectively. Electrode catalyst slurry is coated on the tubular internal surface of the tubular proton membrane. The electrode catalyst slurry comprises a solution or a mixture of the fluorocarbon ionomer or the hydrocarbon ionomer together with a catalyst for fuel cell (or an electrode catalyst with its carrier) to be mixed by ultrasonic waves or a machine to form a mud-like solid-liquid mixture; or to form a gas-included solid-liquid-gas even mixture. The electrode catalyst slurry is coated between a tubular conductive layer (or a hole tube) with leading wire and the tubular internal surface of the tubular proton membrane. Besides, another electrode catalyst slurry is coated between the tubular outside surface of the another tubular proton membrane and another tubular conductive layer (or another hole tube) with leading wire. A mold rod is inserted to adhere the tubular conductive layer (or the hole tube) with leading wire to the tubular internal surface of the tubular proton membrane by enlarging. And, the tubular conductive layer (or the hole tube) with leading wire outside of the tubular proton membrane is obtained by shrinking and tightening; and, at last, the whole pack is pressed after putting in a heat pressing mold so that the tubular proton membrane, the electrode catalyst and the tubular conductive layer with leading wire are closely adhered by the electrode slurry to wholly form a tubular MEA with leading wire to be applied to a fuel cell, especially a liquid fuel cell (such as a DMFC). Accordingly, the present invention is a tubular MEA with leading wire, where the leading wire of a tubular conductive layer and a conductive coating are formed into a whole without electroplating while avoiding the characteristic change of the electrode catalyst; and where the leading wire is led along the surface of the membrane with the characteristics of avoiding jamming the spindle space and of no side floss.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
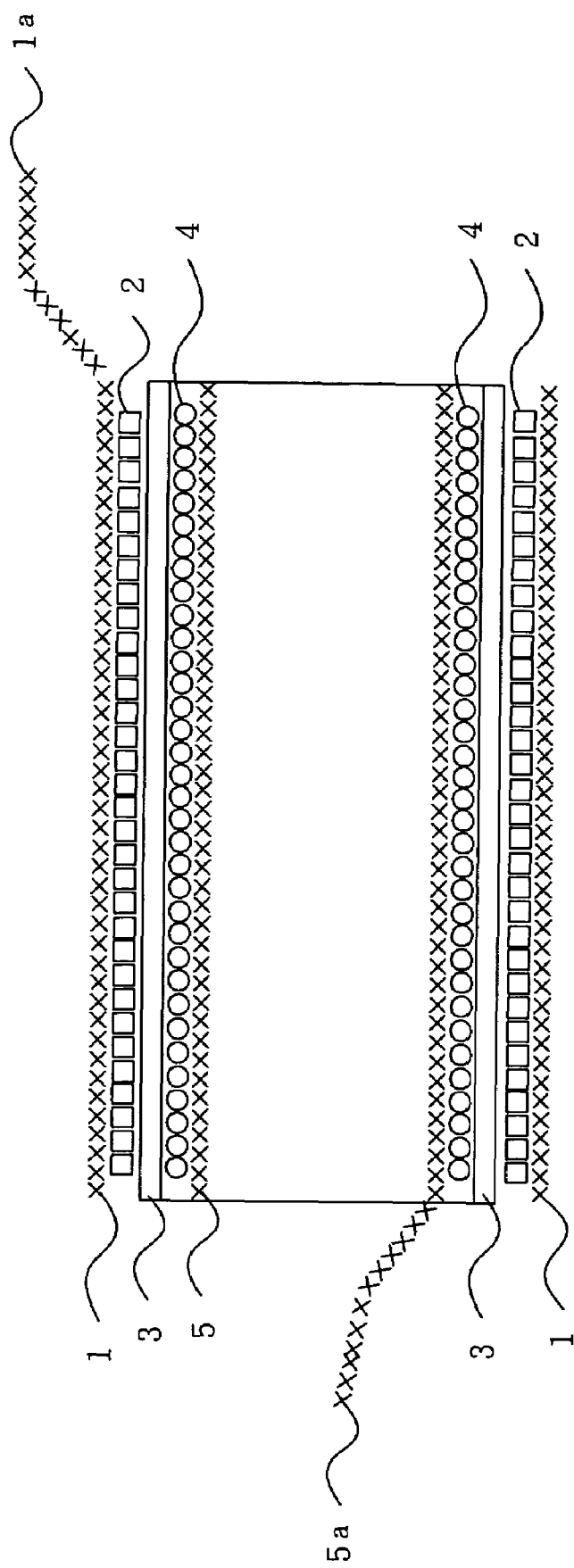
FIG. 1 is a front view of the Membrane Electrode Assembly (MEA) according to the present invention.

The present invention provides a tubular Membrane Electrode Assembly (MEA) with a leading wire. The materials for the tubular MEA are prepared with the followings:

1. A Tubular Conductive Layer 1 (or a Hole Tube) with Leading Wire:

The present invention uses a conductive carbon-fiber-weaved tubule made through tubular weaving. Twenty four streams of the carbon-fiber-weaved tubules are soaked in Dupont's Nafion SE 5112 or Teflon 30B and are dried to form divergent tubes of 4~5 mm, which are formed into the tubular conductive layer 1 (or a hole tube) with leading wire on an outside surface of a tubular proton membrane.

2. An Electrode Catalyst Slurry 2:

The present invention uses a catalyst electrode, which is usually used in the anode or the cathode of a Direct Methanol Fuel Cell (DMFC). The catalyst electrode comprises an a node catalyst of Pt/Ru/C of 60/30/10 (Johnson Matthey, Hispec #6000), together with a Pt/Ru/C of 30/15/55 (Johnson Matthey Hispec #7000) and a solution of Nafion SE 5112. The weight proportions of the components are 1:1:10 and the components are evenly well-mixed by an ultrasonic homogenizer to obtain electrode catalyst slurry as an anode catalyst over the outside surface of the tubular proton membrane.

3. The Tubular Proton Membrane 3:

The present invention uses the tubular proton membrane 3, which can be any material that can be made into a proton-exchange membrane. A Nafion material (like R1100 or R1000) is melted under 250° C. and is extruded to form a ring-shaped mold head of a tubular of R1100 or R1000 to be hollowed inside by blowing nitrogen into a ring-shaped inner tube. After being cooled down and winded up, a tubular proton membrane (Proton Exchange Membrane) is obtained. By adjusting the feeding speed of a plastic grain of R1100 or R1000, the blowing speed of the nitrogen, and the line-bundling speed of the winding up, tubules with a variety of tubular diameters and wall thicknesses can be obtained. The present invention uses R1100 in a form of a ⅛-inch plastic grain. By a Randcastle screw extruder (Model RCP-0500), under a turning speed of 0.75 rpm for a feeding spiral rod, a pull speed of 0.45 ft/min, and a blowing speed of 3.45 cc/min, a tubular proton membrane made by melted and extruded with hollow tubules of 2 mm tubular diameter and 0.1 mm wall thickness can be obtained. Obtain a 15 cm long of the tubular proton membrane. Soak the inner and outside surfaces of the tubular proton membrane under 60° C. to 80° C. with a 15% KOH and a 35% DMSO for 1~4 hours. Wash it by a de-ionized water for at least three times. And, repeatedly for two times, soak it with a 15% $HNO_3$ solution and wash it. Finally, a tubular proton membrane is obtained.

4. Another Electrode Catalyst Slurry 4:

The present invention uses another catalyst electrode The another catalyst electrode comprises an cathode catalyst of Pt/C of 50/50 (Johnson Matthey #8000), together with a solution of Nafion SE 5112. The weight proportions of the components are 1:10 and the components are evenly well-mixed by an ultrasonic homogenizer (Sonifier, Branson Ultrasonics, Model 250) to obtain another electrode catalyst slurry 4 as an cathode catalyst over the outside surface of the tubular proton membrane.

5. Another Tubular Conductive Layer 5 (or a Hole Tube) with Leading Wire:

The present invention uses another conductive carbon-fiber-weaved tubular made through tubular weaving. Sixteen streams of the carbon-fiber-weaved tubular are soaked in Nafion SE 5112 or Teflon 30 B and are dried to form divergent tubes of 8~1.2 mm, which are formed into another tubular conductive layer 5 (or a hole tube) with leading wire on an outside surface of the another tubular proton membrane.

The above electrode catalyst slurry, especially including the catalyst used for DMFC and the catalyst with a noble metal, is used for fuel cell. The catalyst with a noble metal can especially be a catalyst with a Pt (platinum) metal. And, the electrode catalyst slurry can be coated wholly over the tubular conductive layer; or, it can be coated over a single surface of the tubular conductive layer, which is contacted to a single surface of the tubular proton membrane; or, it can be coated over an outside surface of the tubular conductive layer and over a tubular internal surface of the tubular proton membrane, and be coated over an outside surface of the tubular proton membrane and over a tubular internal surface of the tubular conductive layer. The above tubular conductive layer is made of a base material with conductivity weaved into a form with holes and meshes for passing gas and blocking non-gas; and, the tubular conductive layer has a characteristic of being telescopic before being assembled with the tubular proton membrane. Hence, a tubular conductive layer with leading wire is obtained.

Figure 2:
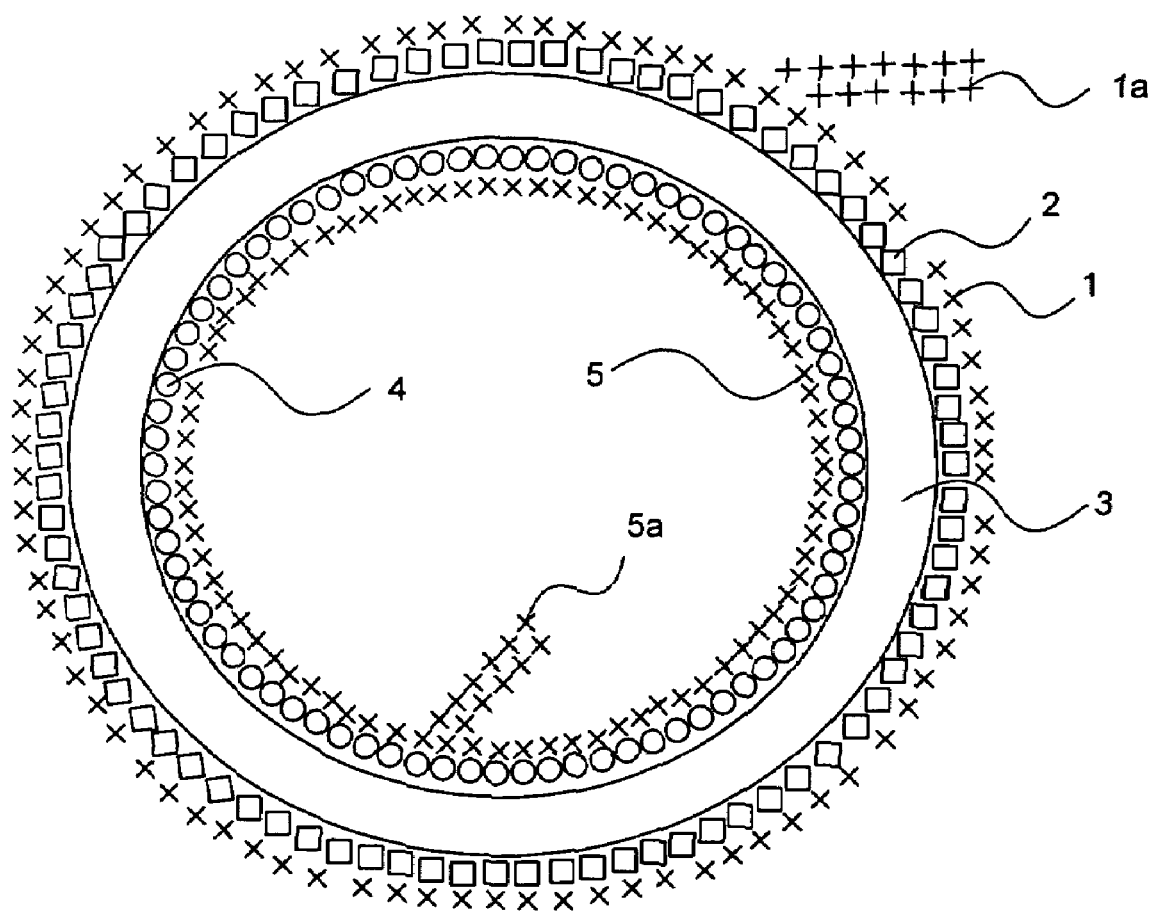
FIG. 2 is a side view of the MEA according to the present invention.
Figure 3:
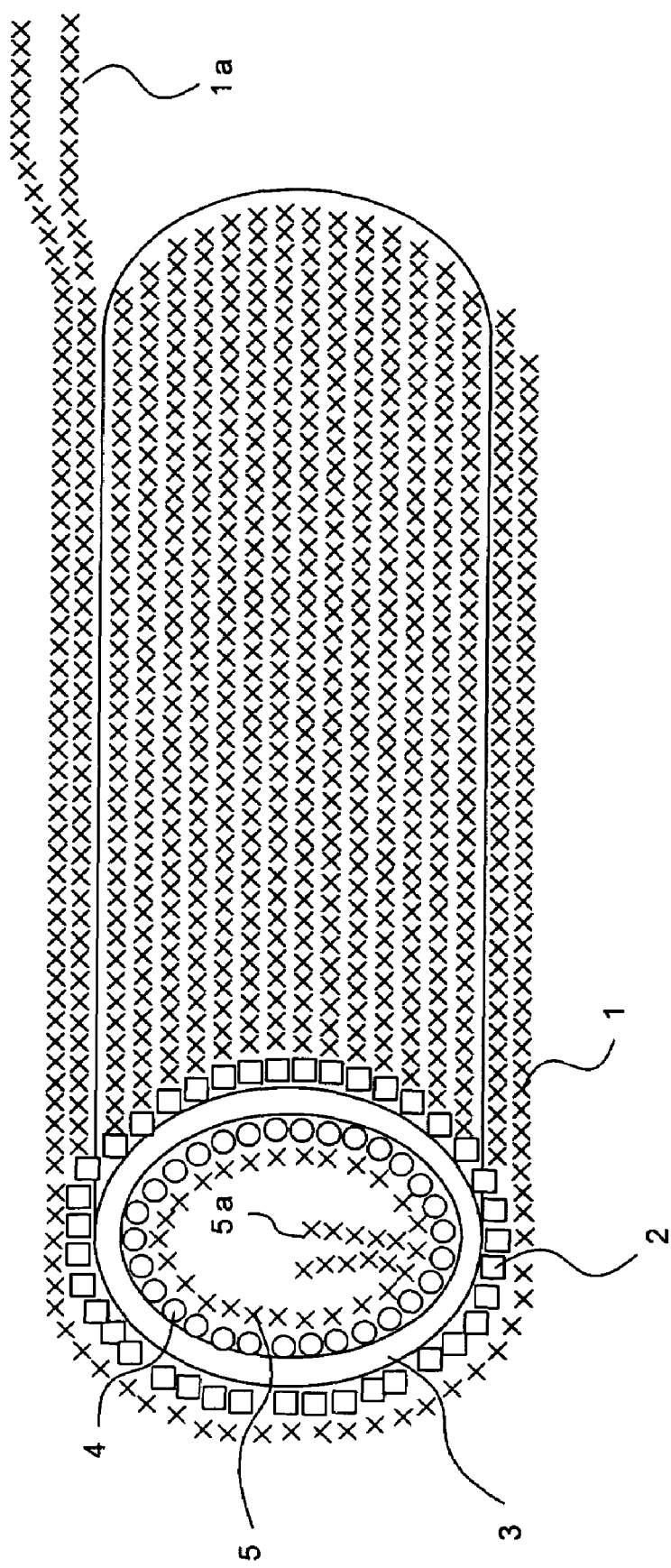
FIG. 3 is a perspective view of the MEA according to the present invention.

Please refer to FIG. 1 to FIG. 3, which are a front view, a side view and a perspective view of a preferred embodiment according to the present invention. As shown in the figures, electrode catalyst slurry 4 is coated on a tubular internal surface of the tubular proton membrane 3 for obtaining an intermediate product by inserting an inner tube, which is between the tubular conductive layer 5 (or the hole tube) with leading wire and the tubular internal surface of the tubular proton membrane 3. Another electrode catalyst slurry 2 is coated between a tubular outside surface of the another tubular proton membrane 3 and the another tubular conductive layer 1 (or another hole tube) with leading wire. Both end areas of the tubular proton membrane is left without coating any anode catalyst for assembling MEAs into a fuel cell. Insert a mold rod with a diameter of 1.5 mm so that the tubular conductive layer 5 (or the hole tube) with leading wire is adhered to the tubular internal surface of the tubular proton membrane 3 by enlargement. Finally, the intermediate product is put into a heat pressing mold as being evenly heated to a temperature between 120° C. and 127° C. for 3~5 minutes, which is a temperature between a glass transition temperature (Tg) of the tubular proton membrane and its melting point temperature (Tm). And then, while the mold pressure is greater then 2 $kg/cm^2$, the intermediate product is pressed so that the tubular proton membrane, the electrode catalyst and the tubular conductive layer with leading wire are closely ad he red to obtain the wholly-formed tubular MEA with leading wire according to the p resent invention. As shown in FIG. 3, the leading wires 1a, 5a can be cut into smaller wires for further requiring re-joint. The ranges for the outside peripheral diameter and the tubular thickness of the MEA are as follow:

(1) The peripheral diameter of the MEA is between 1 mm and 5 cm, and the tubular thickness of the MEA is between 0.1 multiple and 0.45 multiple of the peripheral diameter of the MEA;

(2) The peripheral diameter is between 2 mm and 3 cm, and the tubular thickness is between 0.1 multiple and 0.45 multiple of the diameter or between 0.07 mm and 0.45 multiple of the diameter; or (3) The peripheral diameter is between 3 mm and 2 cm, and the tubular thickness is between 0.1 multiple and 0.45 multiple of the diameter or between 0.1 mm and 0.45 multiple of the diameter.

The preferred embodiment herein disclosed is not intended to unnecessarily limit the scope of the invention. Therefore, simple modifications or variations belonging to the equivalent of the scope of the claims and the instructions disclosed herein for a patent are all with in the scope of the present invention.

What is claimed is:

1. A tubular Membrane Electrode Assembly (MEA) with leading wire, comprising a tubular proton membrane, an electrode catalyst and a tubular conductive layer with leading wire, being wrapped and folded in layers, characterized in that: an original mold of a tubular proton-exchange membrane is made of a polymer through a high temperature melting and extrusion; said original mold is transformed into a tubular proton membrane having a proton-exchange function through an ion exchange; an electrode catalyst slurry made by mixing an electrode catalyst and a base material with a proton-exchange membrane is coated on said tubular conductive layer with leading wire and is inserted into said tubular proton membrane; tubular heat-compression molds are deposed outside and inside of said tubular conductive layer; and, after being heated and pressed, said heat-compression tubular mold is knocked out to obtain said tubular MEA with said leading wire.

2. The tubular MEA according to claim 1, wherein said leading wire of said tubular conductive layer together with said tubular conductive layer is made as a whole without welding and without sticking.

3. The tubular MEA according to claim 1, wherein said polymer is a grain of a flurocarbon ionomer.

4. The tubular MEA according to claim 1, wherein said polymer is a grain of an organic polymer compound of hydrocarbon.

5. The tubular MEA according to claim 1, wherein said electrode catalyst is an electrode catalyst for a fuel cell.

6. The tubular MEA according to claim 5, wherein said electrode catalyst is a catalyst for a DMFC (direct methanol fuel cell).

7. The tubular MEA according to claim 1, wherein said tubular conductive layer with leading wire has a characteristic of passing gas and prohibiting non-gas; and a characteristic of being telescopic before being assembled with said tubular proton membrane.

8. The tubular MEA according to claim 7, wherein said tubular conductive layer is made of a base material with conductivity, being weaved into a form with holes and meshes.

9. The tubular MEA according to claim 1, wherein said tubular conductive layer comprises an appearance of tubule with crevice for allowing ventilation.

10. The tubular MEA according to claim 1, wherein the peripheral diameter of said MEA is between 1 mm and 5 cm, and the tubular thickness of said MEA is between 0.1 multiple of the peripheral diameter of said MEA and 0.45 multiple of the peripheral diameter of said MEA.

11. The tubular MEA according to claim 1, wherein the peripheral diameter of said MEA is between 1 mm and 5 cm, and the tubular thickness of said MEA is between 0.05 mm and 0.45 multiple of the peripheral diameter of said MEA.

12. The tubular MEA according to claim 1, wherein the peripheral diameter of said MEA is between 2 mm and 3 cm, and the tubular thickness of said MEA is between 0.1 multiple of the peripheral diameter of said MEA and 0.45 multiple of the peripheral diameter of said MEA.

13. The tubular MEA according to claim 1, wherein the peripheral diameter of said MEA is between 2 mm and 3 cm, and the tubular thickness of said MEA is between 0.07 mm and 0.45 multiple of the peripheral diameter of said MEA.

14. The tubular MEA according to claim 1, wherein the peripheral diameter of said MEA is between 3 mm and 2 cm, and the tubular thickness of said MEA is between 0.1 multiple of the peripheral diameter of said MEA and 0.45 multiple of the peripheral diameter of said MEA.

15. The tubular MEA according to claim 1, wherein the peripheral diameter of said MEA is between 3 mm and 2 cm, and the tubular thickness of said MEA is between 0.01 mm and 0.45 multiple of the peripheral diameter of said MEA.

16. The tubular MEA according to claim 1, wherein said transformation of said original mold through said ion exchange is done by at least a chemical agent of a strong acid compound.

17. The tubular MEA according to claim 1 wherein said transformation of said original mold through said ion exchange is done by at leased a chemical agent of a strong alkali compound and a chemical agent of a strong acid compound.

18. The tubular MEA according to claim 1, wherein said electrode catalyst slurry is a solution with a fluorocarbon ionomer mixed with an electrode catalyst for fuel cell to make a solid-liquid slurry mixture by ultrasonic waves.

19. The tubular MEA according to claim 18, wherein said electrode catalyst slurry is a mixture of solid-liquid-gas.

20. The tubular MEA according to claim 19, where in said mixing by ultrasonic waves is a mixing by a machine.

21. The tubular MEA according to claim 18, wherein said solution with said fluorocarbon ionomer is a solution with a hydrocarbon ionomer.

22. The tubular MEA according to claim 18, where in said solution with said fluorocarbon ionomer is a mixture of a solution of a fluorocarbon ionomer and a solution of a hydrocarbon ionomer.

23. The tubular MEA according to claim 1, wherein said electrode catalyst slurry is coated wholly over said tubular conductive layer.

24. The tubular MEA according to claim 1, wherein said electrode catalyst slurry is coated over a single surface of said tubular conductive layer, being contacted with a single surface of said tubular proton membrane.

25. The tubular MEA according to claim 24, wherein said coating over said single surface is to coat said electrode catalyst slurry over an outside surface of said tubular conductive layer and an inner surface of said tubular proton membrane.

26. The tubular MEA according to claim 24, wherein said coating over said single surface is to coat said electrode catalyst slurry over an outside surface of said tubular proton membrane and an inner surface of said tubular conductive layer.

27. The tubular MEA according to claim 1, wherein the heating temperature of said being heated and pressed is between a glass transition temperature of said tubular proton membrane and a melting point temperature of said tubular proton membrane.

28. The tubular MEA according to claim 1 wherein a mold pressure for said being heated and pressed is greater than 2 kg/cm$^2$.

* * * * *